(12) United States Patent
Scheideler et al.

(10) Patent No.: US 11,539,737 B2
(45) Date of Patent: Dec. 27, 2022

(54) ADAPTIVE SECURITY FOR RESOURCE CONSTRAINT DEVICES

(71) Applicant: KYNDRYL, INC., New York, NY (US)

(72) Inventors: Tim Uwe Scheideler, Schoenenberg (CH); Matthias Seul, Pleasant Hill, CA (US); Arjun Udupi Raghavendra, Zurich (CH); Andrea Giovannini, Zurich (CH)

(73) Assignee: KYNDRYL, INC., New York, NY (US)

(*) Notice: Subject to any disclaimer, the term of this patent is extended or adjusted under 35 U.S.C. 154(b) by 266 days.

(21) Appl. No.: 17/082,348

(22) Filed: Oct. 28, 2020

(65) Prior Publication Data

US 2022/0131889 A1 Apr. 28, 2022

(51) Int. Cl.
*H04L 9/40* (2022.01)
*G06F 9/50* (2006.01)

(52) U.S. Cl.
CPC ........ *H04L 63/1433* (2013.01); *G06F 9/5077* (2013.01); *H04L 63/20* (2013.01)

(58) Field of Classification Search
CPC .... H04L 63/1433; H04L 63/20; G06F 9/5077
USPC .......................................................... 726/25
See application file for complete search history.

(56) References Cited

U.S. PATENT DOCUMENTS

| 6,865,426 | B1 | 3/2005 | Schneck et al. |
| 7,464,171 | B2 | 12/2008 | Rambhia |
| 7,536,724 | B1 | 5/2009 | Sobel et al. |
| 9,444,829 | B1* | 9/2016 | Ashley ................ H04L 63/1416 |
| 9,565,204 | B2 | 2/2017 | Chesla |
| 10,009,370 | B1* | 6/2018 | Douglas ............. H04L 63/1433 |
| 10,333,965 | B2 | 6/2019 | Gathala et al. |
| 10,419,474 | B2 | 9/2019 | Gonzalez Granadillo et al. |
| 2017/0223030 | A1* | 8/2017 | Merza ................. H04L 63/1416 |

(Continued)

FOREIGN PATENT DOCUMENTS

| CN | 110191083 | 8/2019 |
| CN | 111385288 | 7/2020 |

OTHER PUBLICATIONS

Chigan et al., "Resource-aware Self-Adaptive Security Provisioning in Mobile Ad Hoc Networks," Research Gate, to appear in Journal of IET Information Security, Apr. 2005, 13 pages, https://www.researchgate.net/profile/Yinghua_Ye/publication/4140481_Resource-aware_self-adaptive_security_provisioning_in_mobile_ad_hoc_networks/links/00b49515daef32048d000000/Resource-aware-self-adaptive-security-provisioning-in-mobile-ad-hoc-networks.pdf.

(Continued)

*Primary Examiner* — Teshome Hailu
(74) *Attorney, Agent, or Firm* — John Kennel; Andrew M. Calderon; Calderon Safran & Cole P.C.

(57) ABSTRACT

A method for providing protection of a computing resource constrained device against cyberattacks may include collecting threat intelligence data in form of indicators of compromise (IoC). The indicators may include cyberattack chain related data. The method may also include determining a relevance of the cyberattack chain for the device, measuring a utilization of security measures in terms of their detection of the respective IoCs and their respective responses to the IoCs, measuring a resource consumption of the security measures, and determining a benefit value for at least one the security measure expressed by its utilization and a relevance value of the IoCs detected with it.

20 Claims, 6 Drawing Sheets

(56) References Cited

U.S. PATENT DOCUMENTS

| | | | |
|---|---|---|---|
| 2019/0104138 A1 | 4/2019 | Storms et al. | |
| 2019/0182289 A1 | 6/2019 | White | |
| 2020/0213338 A1 | 7/2020 | Lotem et al. | |
| 2020/0336497 A1* | 10/2020 | Seul | H04L 63/0263 |
| 2022/0224721 A1* | 7/2022 | Bertiger | H04L 41/0686 |

OTHER PUBLICATIONS

Ferrera et al., "Adaptive Securty Framework for Resource-Constrained Internet-of-Things Platforms," Research Gate, Apr. 21, 2018, 6 pages, https://www.researchgate.net/profile/Enrico_Ferrera/publication/310843303_Adaptive_Security_Framework_for_Resource-Constrained_Internet-of-Things_Platforms/links/5adb09ae0f7e9b28593f1fc9/Adaptive-Security-Framework-for-Resource-Constrained-Internet-of-Things-Platforms.pdf.

Seul et al., "Detecting Sensitive Data Exposure Via Logging," U.S. Appl. No. 16/387,632, filed Apr. 18, 2019.

"Introduction to STIX," OASIS Open, Last Updated Aug. 8, 2020, 6 pages https://oasis-open.github.io/cti-documentation/stix/intro.

"STIX™ Version 2.0. Part 1: STIX Core Concepts," Jun. 19, 2017, Working Draft 03, 77 pages https://docs.google.com/document/d/1dlrh1Lp3KAjEMm8o2VzAmuV0Peu-jt9aAh1lHrjAroM/pub#h.u6befh8d18r.

"Kill chain," Wikipedia the Free Encyclopedia, Printed Oct. 16, 2020, 7 pages https://en.wikipedia.org/wiki/Kill_chain.

"Tactics, Techniques, and Procedures (TTPs)," NIST, Computer Security Resource Center, Printed Oct. 27, 2020, 2 pages, https://csrc.nist.gov/glossary/term/Tactics_Techniques_and_Procedures.

"Indicator of compromise," Wikipedia the Free Encyclopedia, Printed Oct. 16, 2020, 2 pages https://en.wikipedia.org/wiki/Indicator_of_compromise.

International Search Report and Written Opinion of the International Searching Authority from PCT Application No. PCT/IB2021/059206 dated Jan. 13, 2022, 7 pages.

* cited by examiner

ADAPTIVE SECURITY FOR RESOURCE CONSTRAINT DEVICES

BACKGROUND

The disclosure generally relates to a security method, and more specifically, to a method for protecting a computing resource constrained device against cyberattacks. The disclosure relates further to a security system for protecting a computing resource constrained device against cyberattacks, and a computer program product.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

Big Data is one application of these new capabilities. Big Data has yielded impressive results, allowing derivation of new and surprising insights to arrive from ploughing through previously unmanageable amounts of data (e.g., data generated by so-called Internet of Things (IoT) devices), thereby drawing conclusions from otherwise unintelligible patterns.

However, the cost of Big Data solutions has meant that the benefits of insight-based policy decisions in IT security may be limited to corporations and organizations with the means to deploy the necessary hardware, giving them an edge and protection over others. Big Data solutions also bind an increasing amount of resources (e.g., power, hardware) to fuel the security infrastructure. This gap may continue grow, given the current trends to attach more-and-more IoT devices to fill the data lakes in the IT centers to allow even more big data analysis.

SUMMARY

According to one aspect, a method for providing protection of a computing resource constrained device against cyberattacks may be provided. The method may comprise collecting threat intelligence data in the form of indicators of compromise (IoC). The indicators may comprise cyberattack chain related data. The method may also comprise determining a relevance of the cyberattack chain for the device, measuring a utilization of security measures in terms of their detection of the respective IoCs and their respective responses to the IoCs, and measuring a resource consumption of at least one of the security measures. Additionally, the method may comprise determining a benefit value for at least one of the security measures expressed by its utilization and a relevance value of the IoCs detected with it.

According to another aspect, a security system for providing protection of a computing resource constrained device against cyberattacks may be provided. The security system may comprise a memory operatively coupled to a processor, wherein the processor, using program code stored in the memory, may be configured to collect threat intelligence data in form of cyberattack chain containing indicators of compromise (IoC), determine a relevance of the cyberattack chain for the device, and measure a utilization of security measures in terms of their detection of the respective IoCs and their respective responses to the IoCs. Furthermore, the processor of the security system, using program code stored in the memory, may also be configured to measure a resource consumption of at least one of the security measures, and determine a benefit value for at least one of the security measures expressed by its utilization and a relevance value of the IoCs detected with it.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain elements for storing, communicating, propagating or transporting the program for use, by, or in connection, with the instruction execution system, apparatus, or device.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a security method; more particular aspects relate to protecting a computing resource constrained device against cyberattacks. While the present disclosure is not necessarily limited to such applications, various aspects of the disclosure may be appreciated through a discussion of various examples using this context.

In the context of this disclosure, the following conventions, terms and/or expressions may be used:

The term "computing resource constrained device" may denote, e.g., an edge device in a computing network environment. The device may be equipped with, e.g., batteries so that energy saving techniques may be used. It may also comprise reducing computing power, etc., or shutting down non-used peripheral components. Very often edge devices comprise price-effective hardware delivering only the lowest amount of compute power required by the task at hand. Therefore, such devices may be configured to have just the amount of computing resources to fulfill the dedicated purpose of the device. Spare resources are typically not installed. Hence, there are constraints in the amount of compute power of such devices.

The term "security threat" may denote a possible danger that might exploited to breach the security of an information technology system, and therefore, cause possible harm. The term may relate to the technical area of computer security and may describe a potential attack, a non-allowed access, a potential destruction or manipulation of data in computer or storage systems by an intruder or intruder system, or a take-over of control of the computer, storage or communication system. The security threats may originate from a cyberattack.

The term "cyberattack" may denote an attempt to access a computing device, e.g., an IoT or edge device (or any other computing device) connected to a data network. A cyberattack may happen as a single security threat, i.e., single cyberattack, or a series of such single cyberattacks, of which most do not represent a real danger for a specific device.

The term "cyberattack chain"—sometimes also denoted as "cyber kill chain"—may denote a sequence of sub-attacks to a computer or similar system. Each stage of the sequence builds on the previous one. For example, there exist theoretical models with seven and eighteen stages, respectively, of a sequence or chain of cyber-attacks. In the course of this disclosure, the terms "sequence of partial cyberattacks," "cyberattack chain," or "cyber kill chain" may be used synonymously. Such cyberattack chains may particularly be dangerous for computing power constrained devices because such devices may not have the computing power or the required memory to follow up on a sequence of partial attacks.

The terms "threat intelligence data" or "cyber threat intelligence data" may denote information from cyber threat intelligence systems about threats and threat actors that helps mitigate harmful events in cyberspace. Cyber threat intelligence sources may comprise open source intelligence, social media intelligence, human intelligence, technical intelligence, or intelligence from the deep and dark web. Providers of cyber threat intelligence data may comprise IT vendors and government organizations, who may cooperate and exchange intrusion data of information about cyber risks to protect IT systems from security attacks.

The term "indicator of compromise" (IoC) may denote, in computer forensics and IT security, an artifact observed on, e.g., a network or in an operating system that with high confidence indicates a computer intrusion. Typical IoCs may comprise virus signatures and IP addresses, MD5 hashes of malware files, and/or URLs or domain names of botnet commands and control servers. After IoCs have been identified in a process of incident response and computer forensics, they can be used for early detection of future attack attempts using intrusion detection systems and antivirus software. Known indicators may be exchanged within the industry. IoCs may be used to detect a cyberattack early on. They may also be used to identify partial cyberattack chains, e.g., as early as during the first or second wave of the chain.

The term "relevance of the cyberattack chain" may denote an importance of a specific cyberattack or security threat—in particular, of a cyberattack chain—for the given resource constraint device e.g., if the device is not operatively active for or with a SQL database, the relevance of a cyberattack chain aiming to undermine the integrity of the SQL database—e.g., an SQL injection—can be seen as low or non-existent.

The term "security measure" may denote an action or function to counteract on cyberattacks or in order to detect such cyberattacks or attack attempts. Furthermore, the security measure may be defined as relevant if the security measure mitigates known threats to assets of the device that are, in principle, vulnerable to the threats. Relevance for a newly discovered security issue might be extremely high, even if there have no hits/findings been recorded to date. In this case, the value of the given security measure may be very high in anticipation of an impending, possible attack. More details on the dependencies to the security measure value calculation are described in the context of FIG. 2.

The term "response to the IoC" may refer to an activity that the device and/or its operating software may undertake to counteract a security threat. This may comprise a deletion, or at least isolation or suppression, of received data or signals.

The term "resource consumption" may denote the amount of computing resources and/or energy required to perform a specific, typically predefined, task.

The term "benefit value" may denote the sum of values over all IoCs. This may require a base relevance (e.g., =1) for all IoCs not comprised in the threat intelligence feed. For example, each port scan detected and blocked by a firewall originating from an Internet Protocol (IP) address not listed as an IoC, adds a base value to the security measure firewall.

The term "susceptibility value" may denote a value that rates the applicability of a cyberattack chain to the environment by comprising the components of the environment, and it may be expressed by the detections of IoCs related to the cyberattack.

Cyber security attacks are among the top concerns of IT (information technology) departments, enterprises, and government organizations. This concern is likely to increase because new regulations, such as the General and Data Security Regulation (GDPR), may expose enterprises to high monetary fees and penalties if they do not adequately protect their customers' data. As a result, the role of the chief information security officer (CISO) is becoming increasingly important.

One of the important tasks of a CISO is to manage an organization's security information and event monitoring (SIEM) solution. Today, most of the SIEM solutions available on the market utilize a set of complex correlation rules that must be monitored and tuned by highly skilled personnel in order to identify and detect potential security threats that may lead to security incidents. These SIEM correlation rule engines demand comparably high system resources (e.g., in form of CPU time and memory requirements) because the correlation words are designed based on regular expressions (regex) filters and thresholds in order to match a set of conditions and cross dependencies, which in turn, need to be checked, evaluated and assessed in real-time while, at the same time, a massive number of security events are received and written to log files. For example, security events and logs produced in a typical IT environment, as well as by security solution end devices, may vary between 1 klk EPS (events per second) to 100 k EPS and may have to be correlated across a set of approximately 150 to 400 distinct rules on average. Hence, most SIEM systems have a very high demand on computer system resources.

These difficulties are likely to increase, as the number of deployed information technology devices and networks is ever growing. Worse, the average available computing power per device is not growing with the same speed, in part because many so-called Internet-of-Things (IoT) devices are being attached to data networks. In these IoT devices, the focus is typically more on the lowest possible power consumption for a very specific task. Hence, the available computing resources in such devices may just be enough to fulfil the design goal (i.e., the specific task they have been developed for), but not the increasing security requirements.

This gap between the risk of cyberattacks or cyberattack chains, or parts thereof, and the available resources in a device with limited resource may advantageously be closed. Accordingly, some embodiments of this disclosure may provide for protection of a computing resource constrained device against cyberattacks such that the embodiment may offer multiple advantages, contributions and technical effects, including enabling a protection against cyber threats suitable for devices that only have limited spare capacities to deal with unplanned computational requirements because of a cyberattack. In some embodiments, the few available resources may be used intelligently to respond only to those potential threats that are relevant for that device. This may be achieved in some embodiments by determining a relevance level value and a benefit value based on IoCs. In this way, a permanent balance may be achieved between invested resources—in particular, in terms of computing power—and a "good enough" protection in computing environments in which low cost and low power consumption are success factors, but which may also be a target of cyber threats. This may be particularly beneficial for low cost, low power and "lean" end point devices (e.g., IoT devices deployed massively in, e.g., modern manufacturing, logistics, smart city, or smart home environments). Some embodiments may be used advantageously in smart vehicles, e.g., self-driving cars or also surveillance infrastructures.

Furthermore, by sharing the security or protective measures, a swarm—i.e., a plurality of low cost and/or low power devices—may share the burden of a protection by sharing the resources and/or computational effort required to protect each single device.

Also, even in computational well-equipped IT systems in which typically the assumption is made that "unlimited resources" are available for cyber-protection, the newly proposed concept may be used beneficially. Here, lower power consumption may be a result of an implementation of the proposed concept in such IT systems. This may be a useful contribution to environmental protection.

According to one possible embodiment, the method may include assigning to each of the cyberattack chains a susceptibility value based on the benefit values of the security measures that contribute to a disruption of the cyberattack chain. The susceptibility value, in turn, may rate the applicability of a cyberattack chain to the environment (e.g., by evaluating the components of that environment) and it may be expressed by the detections of IoCs related to the cyberattack.

According to another possible embodiment, the method may also include determining, based on the susceptibility value, a value of effectiveness for each security measure by summing up the specific security measure's contributions to disrupting each of the attack chains, as protection for the device. The value of effectiveness, in turn, may be an expression of the chances for success to protect the device against cyberattacks, in particular those coming in waves. Each wave—apart from the last one—may not be threatening alone to the device's data and/or function. However, the value of effectiveness may express the effectiveness to render one of the waves useless (see from the attacker side) and thus, the complete attack chain.

According to some embodiments, the method may also include selectively enabling and/or disabling security measures such that the value of effectiveness of all enabled security measures may be optimized towards a disruption of the cyberattack chains with the amount of available computing resources sufficient to satisfy the resource consumption of the enabled security measures. This may also be seen as a check-and-balance function between the uninterrupted functioning of the device, a response time of the device to incoming working signals, and incoming attack signals. Security measures (e.g., specific security functions) may be disabled if is determined that they are not effective in a current situation and/or if their use may be too compute-intensive.

According to some embodiments of the method, the determination of the relevance value for a security measure may be based on at least one factor selected out of an external assessment of attack types, attack types which have always been taken into account, installed hardware and/or software, and an installation specific configuration. Illustrative examples of "attack types which have always be taken into account" may include, without limitation, an SQL (Structured Query Language) injection, cross-site scripting, man-in-the-middle attacks, etc. This may be a typical attack again the functioning of a database, e.g., to collect unauthorized data. If, in contrast, a database is not installed, some embodiments may allow that the related relevancy for a security measure functioning against SQL injection to indicate that the selected security measure not be used because there would be no threat in this scenario. Such enabling and disabling may also be possible for other security measures using the sum of installed hardware and software attached to and/or installed on the device.

Additionally, certain industries may be subject to specific government regulations such that certain security measures have to be used in any case. Examples of such industries are the military sector, the insurance sector, the healthcare industry, and the banking sector.

According to some embodiments of the disclosure, the benefit value assigned to the security measure may be determined by multiplying the number of times a security measure has detected an IoC by the relevance value of the respective IoC. In some embodiments, benefit value may more specifically be:

benefit value (IoC)=(1+number of hits(IoC))*relevance value (IoC).

In some embodiments, historic data may also be used to protect the device. Additionally, the quality of the received indicators contributing may play a significant role. The higher the quality of the indicator values, the higher the number of hits may be registered. This, in turn, may be interpreted as a collective memory of constituent elements being part of or supporting the disclosed security methods and systems.

According to some embodiments, the number of times a security measure may have detected an IoC may need to exceed a minimum number of times. In some of these embodiments, the benefit value assigned to the security measure may be determined by the formula benefit value:

$$\text{(IoC)}=\max(\text{number of hits(IoC)}-\text{base threshold value}, 0)*\text{relevance value (IoC)}.$$

If, e.g., the base threshold value may be set to 4, the value contribution in these embodiments is only given for multiple hits, i.e., larger or equal to 5. In this way, a fine tuning of the result for the benefit value may be determined, allowing a fine-grained optimization of security measures, an environment of the device and probabilities of cyberattack chains.

According to some embodiments, the method may also include re-determining regularly the benefit value at pre-defined times. Thus, an assessment regarding a threat level may be performed whenever required. This may vary depending on a variety of environmental parameters, such as the otherwise protection of the network the device is attached to, the number of known threats for the type of devices, the required security level for a given industry and its regulations, etc.

According to some embodiments, the re-determining may also include selectively applying security measures to selected ones of a group of devices. It may be assumed that when a plurality of the computing power constraint devices are e.g., connected to the same network, or are e.g., deployed in the same or similar industrial context, only selected ones of the plurality may apply a predefined security measure while other devices in the same group may apply other selected security measures. This may assume that if one of the plurality of devices may be vulnerable to cyberattacks, the others in the same group may also be vulnerable. Hence, the protective activities (e.g., the security measures) may be shared between the devices in the group. As a result, a much lower number of security measures may need to be applied to each individual device because the devices may share the computing power required to protect all of them. If one of the group may have detected a specific cyberattack, it may inform the others by sending a related signal. A security coordination system connected to the plurality of computing resource constraint devices may coordinate the security measure individual devices use. As an illustrative example, a virus scanner may be a deployed security measure for one of the devices in the group, while another device in the group may deploy a fire wall.

According to some embodiments, the method may also include re-determining the benefit value when an amount of available resources in the device has changed or when a predefined significant set of the cyberattack chains has significantly changed. These embodiments may help to keep the security level of the devices at a predefined level so that the overall risk is reduced as much as possible while considering the available resources.

In the following paragraphs, a detailed description of the embodiments depicted in the figures will be given. All instructions in the figures are schematic. Firstly, a block diagram of a method for providing protection of a computing resource constrained device against cyberattacks is given, consistent with some embodiments. Afterwards, a security system for providing protection of a computing resource constrained device against cyberattacks will be described, consistent with some embodiments.

Figure 1:
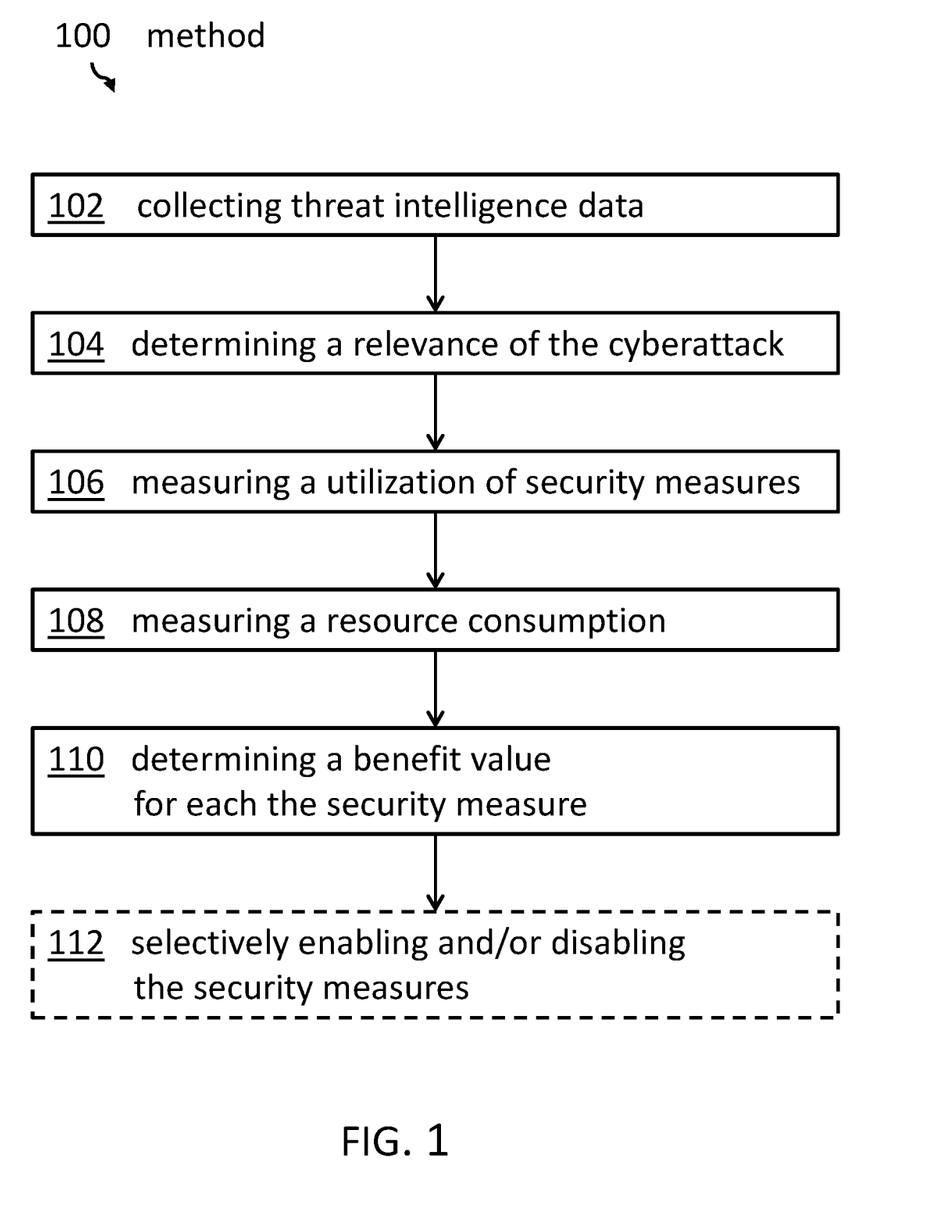
FIG. 1 shows a block diagram of an embodiment of one method for providing protection of a computing resource constrained device against cyberattacks, consistent with some embodiments.

FIG. 1 shows a block diagram of an embodiment of the method 100 for providing protection of a computing resource constrained device against cyberattacks. The method 100 may include collecting 102 threat intelligence data in form of indicators of compromise (IoC). The indicators may include cyberattack chain related data.

The method 100 may also include determining 104 a relevance of the cyberattack chain (e.g., using the IoCs) for the device; measuring 106 a utilization of security measures in terms of their detection of the respective IoCs and their respective responses to the IoCs; and, based on that, measuring 108 a resource consumption of the security measures. Next, the method 100 may include determining, 110, a benefit value for at least one of the security measures expressed by its utilization and a relevance value of those of the IoCs detected with it.

Additionally, the method 100 may include selectively enabling and/or disabling 112 the security measures such that the effectivity value of all enabled security measures is optimized towards a disruption of the cyberattack chains with the amount of available computing resources sufficing to satisfy the resource consumption of the enabled security measures.

Figure 2:
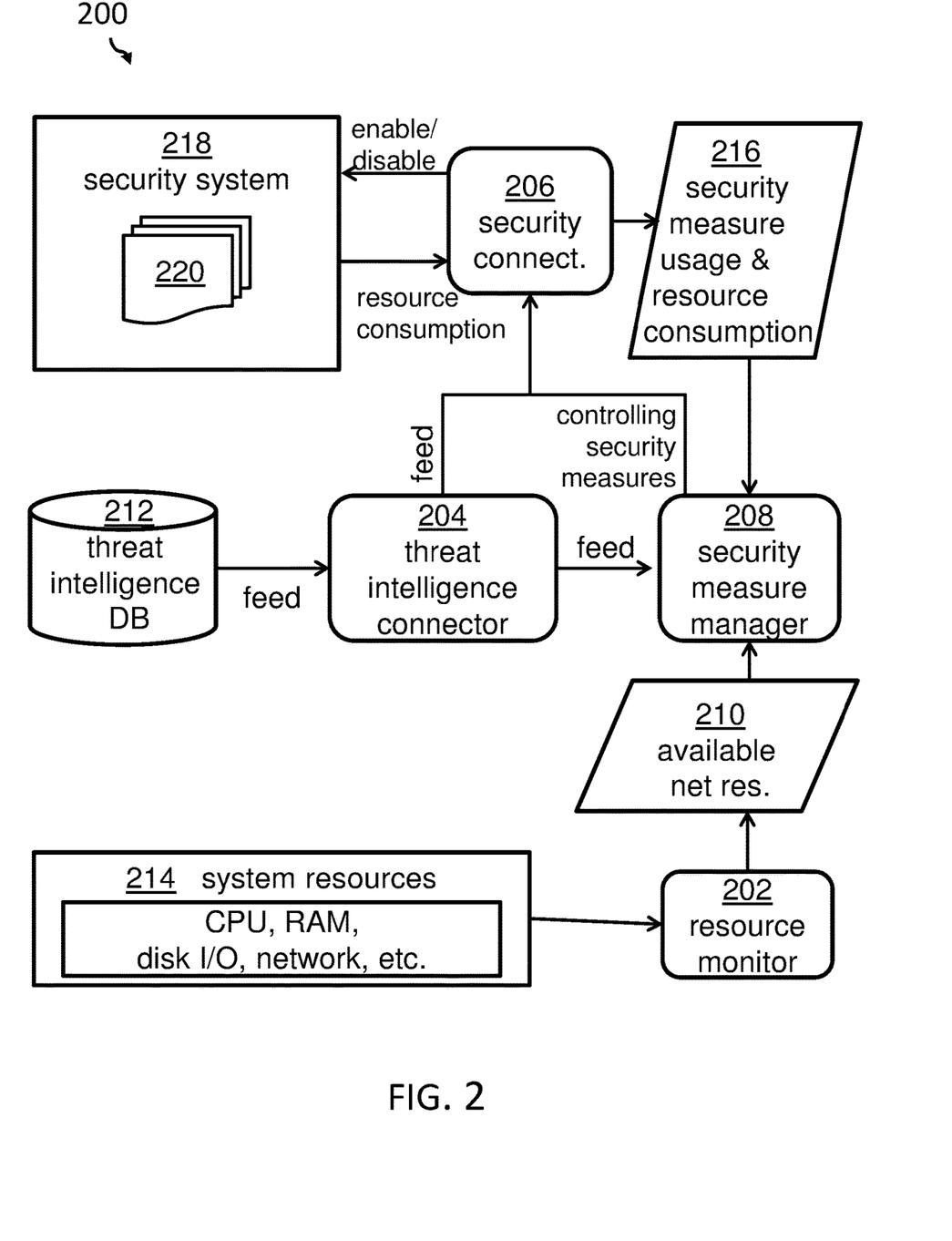
FIG. 2 shows a block diagram of components instrumental for executing the proposed method and supporting the proposed security system, consistent with some embodiments.

FIG. 2 shows a block diagram 200 showing some components for executing the proposed method and supporting the proposed security system, consistent with some embodiments. The units and modules discussed in this context focus on computational cost and values achieved by the disclosed method. In the illustrated embodiment, these measurements do not have to be performed on each device. Rather, the devices may be grouped by type and exposure to the threat landscape. Moreover, enabling and disabling of functions does not necessarily mean that a function is switched off/on; in some embodiments, the enabling/disabling may be done by assigning a high/low nice factor (e.g., in the LINUX® operating system terminology) or a relatively low process priority in the WINDOWS operating system (LINUX® is a trademark of Linus Torvalds in the United States, other countries, or both; WINDOWS® is a trademark of Microsoft Corporation in the United States, other countries, or both).

The embodiment in FIG. 2 may comprises the following components: a resource monitor 202, a threat intelligence connector 204, a security connector 206 and a security measure manager 208. The resource monitor 202 may be used to determine available net resources 210 (i.e., resources that are currently not used by the operating system or any application) on the host system, as well as a remotely deployed system if a distributed architecture is used. The resource monitor 202 may be built of existing system profiling and benchmarking software (e.g., GeekBench®, available from Primate Labs Inc.) to determine a given "score" to the system's capabilities (e.g., the system's resources 214 in the form of the available CPU(s), RAM, disk I/O, network capabilities, etc.) However, other approaches to measure system performance, such as are commonly used in tests conducted by computer hardware publications, etc., may be used in some embodiments. The achieved score may either be taken as-is or may be converted into performance points to be used by the security measure manager 208.

As an illustrative example, a given reference CPU utilized for one second can equal 1 CPU point, 1 GB RAM used for one second equals 1 RAM points, 100 disk I/O operations/sec. equals 1 disk point, and 1 MB/sec. of data transfer equals 1 network point. The resource monitor 202 may determine a vector of independent performance points, for instance (CPU, RAM, disk I/O, network)=(42, 2, 0.5, 4) performance points. Performance points may be handled as a vector, as different security measures consume a different combination of resources, and in many cases, lack one resource that cannot be compensated for by utilizing another one.

Referring again to FIG. 2, the threat intelligence connector (TIC) 204 may provide data from a threat management source, such as the threat intelligence database 212. The threat intelligence database 212, in turn, may provide a constant data feed to the threat intelligence connector 204. From here, the threat intelligence data may be fed to the security measure manager 208 to calculate the value of each security measure. The TIC may connect to public open source intelligence feeds (Open Source Intelligence, or OSINT), commercial APIs (e.g., IBM X-Force Exchange®, available from International Business Machines, Inc. of Armonk, NY), and custom intelligence sources that an organization may have deployed (e.g., internal Security Operations Center (SOC)).

The security connector 206 may act as the main interface to the application programming interface (API) of the security system 214 in some embodiments, providing security measures to the endpoint/device. The security connector may use an API to query available security measures (e.g., to detect patterns used to identify specifically crafted packets, payloads or sequences of requests); to measure the usage of security measures and their benefit per performance required here denoted as value/cost (e.g., frequency of usage number of findings); to identify relevant meta-data (e.g., number of common vulnerabilities and exposures (e.g., common vulnerabilities and exposures (CVE)) protected against exploits, connections to (e.g., security attack) campaigns, Tactics, Techniques and Procedures (TTPs)) by leveraging existing threat intelligence provided by the threat intelligence connector 204.

Additionally, the security connector 206 may measure the resource consumption of each security measure 216 by using system performance metrics such as I/O cycles, CPU time consumed, memory used, etc., with off-the-shelf tooling, such as the open source "dstat" tool.

The ratio value/cost of security measures may be defined in some embodiments by the number of signatures (e.g., retrieved from the vendors' database) that have identified specific CVEs, the number of complains (e.g., retrieved from threat intelligence) defined that could harm the endpoint having a set of existing CVEs, the number of rejected connections by the host intrusion protection system, etc.

The security connector 206 may also use existing APIs to enable/disable functions and, within those functions, to enable/disable specific rules or product features and to create/delete rules to manage the system's rule set dynamically.

The security measurement manager 208 may look at both the current value of a given security measure (e.g., frequency of usage, number of findings, current relevance) and the actual costs in terms of resource consumption of running a given security measure.

Figure 4:
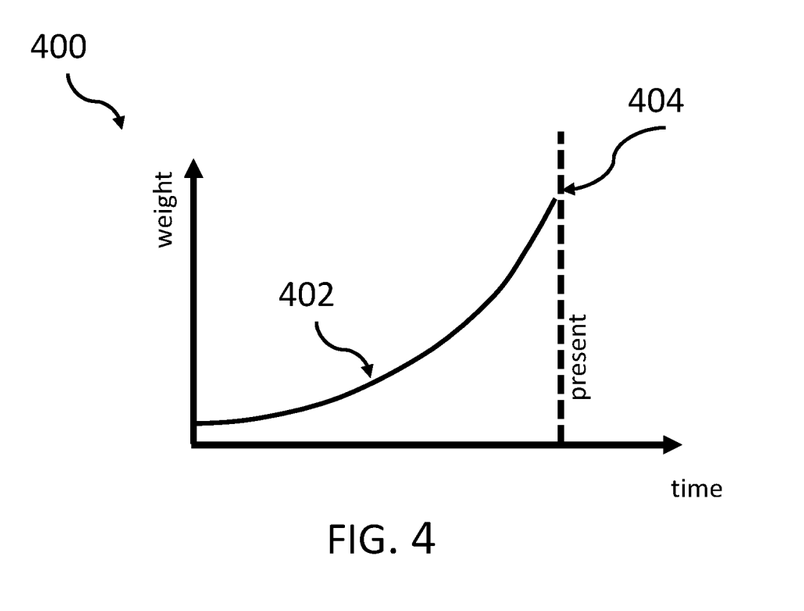
FIG. 4 shows a diagram illustrating a weight function effect of the security-related process profiling for an on-the-fly evaluation, consistent with some embodiments.

For the calculation of the resource consumption (i.e., costs), the resource consumption may be determined by an on-the-fly measurement, by a stand-alone measurement conducted in low-throughput times, or a combination of both. The on-the-fly evaluations may look at the ratio performance/resource consumption of the specific security measure, e.g., every time a related Bayes Module runs in the current traffic situation, it takes 150 ms to complete, creating a CPU load of 5.79% and using 130 MB of RAM without disk I/O. The cost determination may run continuously, gathering statistics about the consumption of the process in the actual system, which may be stored in log files because a one-time measurement could lead to an inaccurate assessment. This log of historical data may be used to map the security-related processes updating the average runtime and its standard deviation per interested process. As the configuration on the device may change over time (e.g., other processes started with large disk I/O consumption), a larger weight may be given to the latest entries of the historical log. In some embodiments, weight functions in the calculation of the weighted average may show an exponential growth, as shown in FIG. 4.

The standalone evaluations may subject a given security measure to a standardized test-set of content to arrive at a benchmark. These standalone evaluations may be done by a vendor of the security system and then handled statically by the proposed concept when deployed, or may be done on a regular basis to generate benchmarks for user-provided additions (e.g., RegEx matches). In the latter case, no historic log data are needed; however, the current device consumption should be measurable, as the benchmark mapping will depend on the available resources. If, however, only partially operating conditions are used as the benchmark, the remaining data may be dynamically augmented using the on-the-fly method.

These measurements may be conducted by using system specific performance monitoring, e.g., attaching to the specific threat and collecting the performance data as the threat is active, or by using product-specific measurement methods if the product in question exposes them. For example, some security tools provide counters or measure the resource consumption of individual security techniques.

With continuing reference to FIG. 2, the security system 218 may be enabled to the security measures e.g., anti-virus, anti-malware, network intrusion prevention, usage of behavior analytics, web proxy data, security information and event monitoring (SIEM), etc. (all shown as reference numeral 220). The value determination of the security measures may be calculated in some embodiments using the value of the security measures determined, direct metrics (e.g., utilization and number of findings, with more being better), and/or indirect metrics (e.g., relevance).

A security measure may be marked as relevant if the security measure mitigates known threats to assets in the computing environment which are in principle vulnerable to the threats. The relevance value for a new leave discovered security issue may be extremely high, even if there have been no hits/findings being recorded—to date. In this case, the value of the given security measure may be very high in anticipation of then impending, possible attacks.

In some embodiments, the dependencies to the security measure value calculations include:

External assessment (is done at installation and is routinely updated): To determine a relevance vector, some embodiments may link a given security measure's metadata (e.g., CVE, attack type, etc.) and match it with current security trends gathered from, e.g., OSINT and proprietary security intelligence. A measure that protects against a brand-new exploit is thus ranked very valuable, even if it has not seen any prior use. The value may also be re-evaluated if a cyberattack is popular. Certain attacks that are used over a long time (e.g., code SQL injection) may be considered as "evergreen," and thus, always considered to be valuable to at least an intermediate degree, regardless of a current usage.

Installed software: This value may take into account whether the security measure is actually applicable to what the organization has developed or is exposed to. For example, if the organization has no MySQL server deployed, a measure specifically protecting MySQL systems will be deemed of very low value. Some embodiments may leverage data gathered from an inventory scanner and/or a vulnerability scanner to gain knowledge about the organization's deployment structure.

Custom configuration: this value may also be derived from the organization's need—the organization using some embodiments may weigh specific preferences depending on the security exposure and consequences thereof. For example, some organizations may prefer to protect against attacks for a given operating system. This information may be provided as pre-defined parameters and/or automatically, using a hardware/software inventory scan.

As an example, the threat intelligence in the known STIX format (Structured Threat Information eXpression) provides a rich set of attributes for assessing the relevance value of the security measure like, publication date, confidence, impact, probability, severity, detect motivation (ranking from accidental 1 to revenge 9), industry sector (insurance, mining, retail, . . . ), etc. In a concrete implementation, a (sub)set of attributes is selected to create the multiplying factor. For example, the relevance for an IOC can be calculated as:

relevance (IOC)=confidence level high (e.g., =3)*impact low (e.g., =1)*probability media am=2*detect motivation personal gain (e.g., =4)=24.

In one implementation, the value assigned to a security measure when sporting an IoC is determined as:

value (IoC)=(1+number of hits (IoC))*relevance (IoC). Thereby, 1 is selected as base value to include the contribution of threats not yet observed.

In another implementation, the value assigned to a security measure when spotting an IoC is calculated as:

value (IoC)=max(number of hits (IoC)−base factor, 0)*relevance (IoC).

In some embodiments, the value contribution may only be given for multiple bits above the base factor.

The overall value of a security measure may thereby be defined as the sum of values over all IoCs. This may be normalized against a base relevance (e.g., =1) for all IoCs not contained in the threat intelligence feed. For example, each port scan detected and blocked by a firewall originating from an IP address not listed as an IoC may add a base value to the security measure firewall.

The following illustrative example focuses more on cyberattack chains, also known as "security cyberattack chains." While the cost/value and resource data are provided, the system is here-tasked with finding an optimal combination of security measures active that will maximize the protection value and use the available resources most efficiently.

One approach to utilize the knowledge of value/cost per security measure would be to focus on the high-value per cost measures and throttle the other measures. However, this approach may be vulnerable to changes in the attackers' approaches. For best protection, some embodiments include a forward-looking method (i.e., expected attacks), rather than a backward-looking approach (i.e., using data observed in the past). To do that, the scoring model may be expanded to not only consider an individual method's effectiveness, but also to look at cyberattack chains. Cyberattack chains, being a sequence of individual attacks, are also called tactics, techniques, and procedures (TTP) used as part of an attack campaign. Expanding the view to cyberattack chains may allow some embodiments to deal with several smaller, low-risk attacks that can be combined to create something of higher risk.

The following illustrative example may be considered: for threat intelligence, the TIC has provided information about two ongoing campaigns in form of two cyberattack chains including the corresponding indicators of compromise (IoC) and common value vulnerabilities and exposures (CVEs). The security system may consider the following measures (anti-virus/anti-malware (AV/AM), network intrusion prevention system (NIPS), user behavior analytics (UBA), web proxy (WP).

The following table illustrates how each of the provided security measures may come into action during the course of each cyberattack chain:

TABLE 1

| cyberattack chain "data exfiltration" | | | |
|---|---|---|---|
| threat intelligence: TTP | network scan to identify SQL servers accessible from internet | probe servers for a specific vulnerability | connect to servers exploiting vulnerability and exfiltrate data |
| threat intelligence: IoC | source IP, port number | CVE for SQL | n/a |
| countering security measure | network intrusion prevention system | network intrusion prevention system | user behavior analytics |
| cyberattack chain "malware" | | | |
| threat intelligence: TTP | sending of emails containing a link to a malicious web site | transfer malware to target system when user opens web site | install and run malware on target system |
| threat intelligence: IoC | link to malicious web site | name and IP of web site | file signature |
| countering security measure | anti-virus/Anti-malware | web proxy | anti-virus/anti-malware |

In general, for each of the n cyberattack chains or cyberattacks:

$CAC_i$, i=1, ..., n provided by the TIC, a list of measures with their corresponding IoCs may be stored:

$CAC_i$={measure$_1$(IoCs), measure$_2$ (IoCs), measure$_3$ (IoCs), ... }

Based on the observed activity and the security measures utilized, the value/cost of each cyberattack chain CAC, may be constantly evaluated and may vary over time. Some embodiments use this value/cost to allocate resources into the most dangerous cyberattack chain providing the best value/cost.

Figure 5:
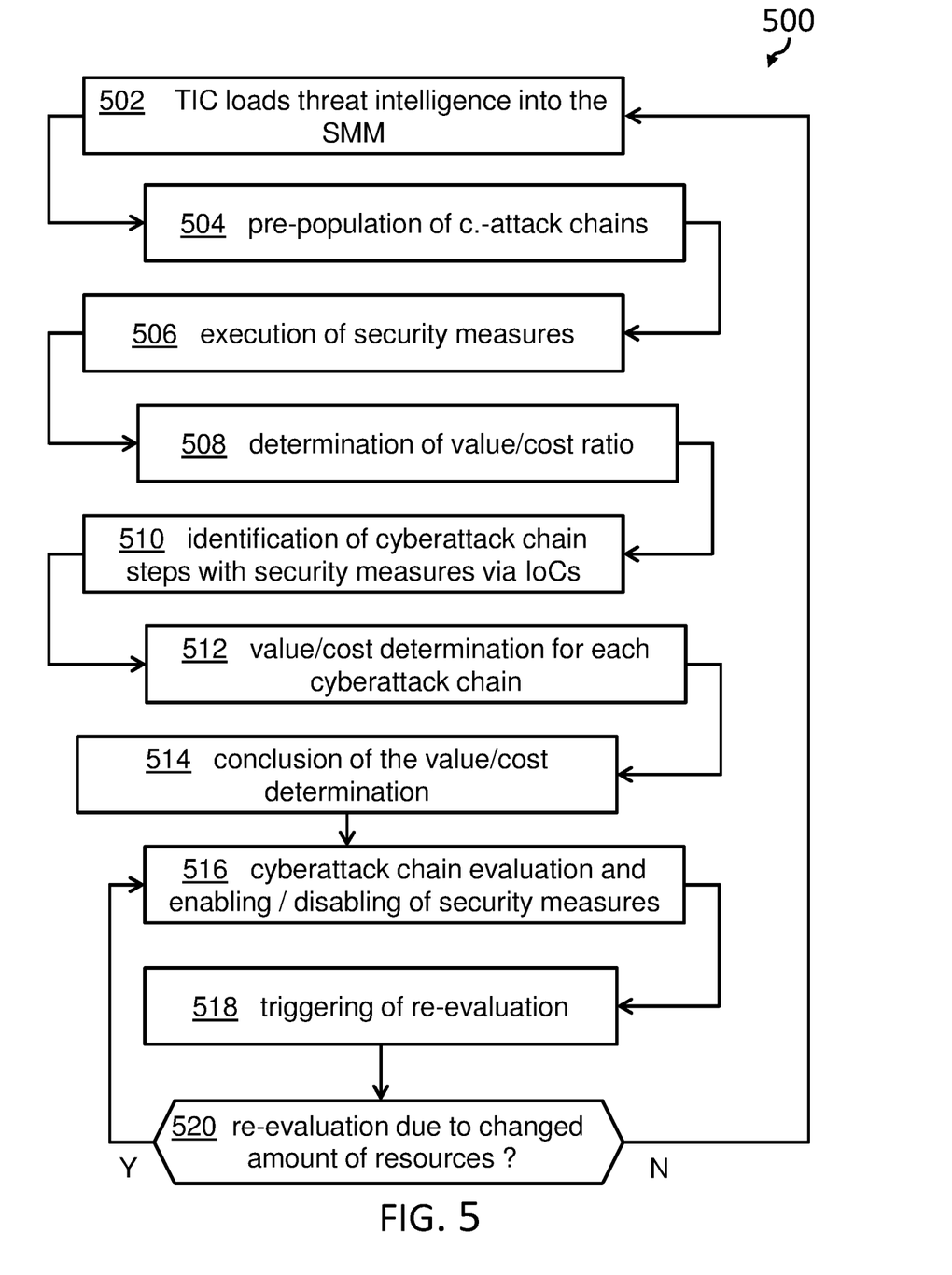
FIG. 5 shows an extended flow chart of steps of an embodiment of the proposed concept, consistent with some embodiments.

One feature and advantage of the scoring model in some embodiments is to rate each individual cyberattack chain by utilized measures, their completeness/occurrences, and their indication strength. As cyberattack chains are comprised of different steps (TTPs, see above), the first step may be to identify and rank the prevalence of the steps. Consequently, FIG. 5 shows an extended flow chart 500 of steps of an embodiment of one such embodiment. However, before turning to FIG. 5, FIGS. 3 and 4 should be considered.

Figure 3:
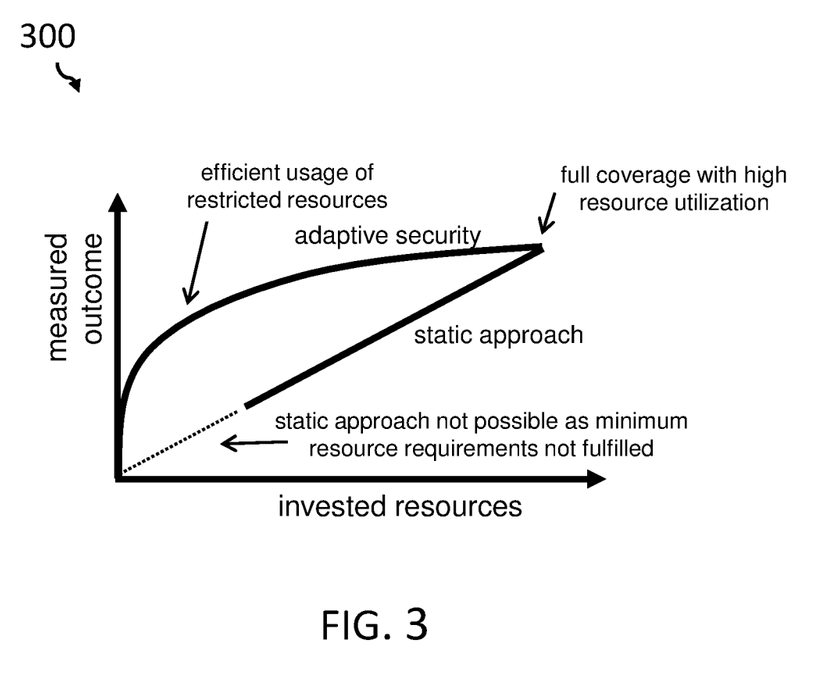
FIG. 3 shows a diagram showing the efficient use of resources to achieve a sufficient result, consistent with some embodiments.

FIG. 3 is a graph 300 illustrating the efficient use of resources to gain a sufficient outcome, consistent with some embodiments. The embodiment graphed in FIG. 3 aims to provide a system that is able to manage severely limited system resources in an outcome-oriented manner, instead of using a predefined, static set of security controls, which are often defined as the maximum possible security (without regard for cost e.g., computation cost), rather going for an optimal security level for the security constrained environment.

In some embodiments, the system may treat given system resources (e.g., CPU power, memory, disk space, IO, network throughput, etc.) as a "budget" to be managed and "spent" (i.e., utilized) on the most effective security measure. In other words, the available resources may be used to optimize the efficiency of the security measures.

Each security measure (e.g., pattern scan, deep packet analysis, sandboxing, etc.) may be measured by the resources required to execute past performance, estimated current relevance, estimated future relevance according to threat intelligence sources, and performance alignment. The system may then actively manage the security measures utilized by spending the available resource budget based on the received measured outcome. In this way, some embodiments may optimize a limited budget for security success and pre-defined requirements and needs of the owning organization.

As an outcome, some embodiments may allow for deployment of an effective, adaptive security blanket depending on the resource budget and on the current estimated danger of the incoming attack types, which may evolve with time as more low-power devices (e.g., such as routers, network switches, end-user hardware (e.g., cell phones), and/or IoT devices) are added. While the resulting protection strength may never match the quality and scope of a high-power, "unlimited budget" system, the dynamically optimized system may get "close enough" to provide a better protection than a static approach can provide.

This optimization is shown in a graphical way in FIG. 3, with the measured outcome (y-axis) versus the invested resources (x-axis). The static approach, which would not allow any measured outcome without a minimum of invested resources, may be available. However, on the other side, with an efficient usage of restricted resources, an adaptive security can be achieved. Thereby, both approaches, the static approach and the adaptive approach, converge to full security coverage with high resource utilization.

FIG. 4 is a graph that shows a diagram 400 illustrating a weight function effect of the security-related process profiling for an on-the-fly evaluation, consistent with some embodiments. The weight factor (Y-axis) in this diagram 400 is increased over time (x-axis) leading to the parabolic curve 402 to arrive at a specific value 404 for a present time.

FIG. 5 illustrates a sequence of operations consistent with some embodiments of the disclosure. In FIG. 5, the TIC may first load threat intelligence data in form of cyberattack chain information into the security measure manager (SMM) 502. Secondly, in case a base value >0 (see above) has been chosen in the implementation, the cyberattack chains may be prepopulated 504 for each IoC which values determined by Value(IOC)=Base Value*Relevance(IoC).

Thirdly, security measures may execute 506 when an attacker applies TTPs. Fourthly, a value/cost ratio may be determined 508 for each security measure, as described above. In some embodiments, the value/cost ratio may be determined per measure, not on an individual IoC level. Fifth, using information about IoCs, individual steps in each cyberattack chain can be identified 510, and with them, the individual security measures that have detected the IoCs are assigned to the respective cyberattack chain(s).

As a sixth activity, a value/cost ratio may be determined 512 for each cyberattack chain. This may happen in the following sub activities:

(a) The first measure may detect the first IoC that is contained in the cyberattack chain.
(b) The value/cost ratio of the first measure may be assigned to the cyberattack chain.
(c) If the same measure has identified the same IoC in another cyberattack chain, a bonus factor may be assigned to measure. For example, some embodiments may use the square root of the number of cyberattack chains containing the IoC, i.e., the IoC is only detected in this cyberattack chain, then the factor is 1 (i.e., no bonus); if the IoC detected in this and three other cyberattack chains, then the factor is sqrt(4)=2.
(d) When the first measure detects the same IoC repeatedly or other IoCs in the same cyberattack chain (e.g., either in the same phase or in different phases), the value may be added, but the cost remains unchanged (e.g., because the overall resource consumption of the security measure is observed, not the consumption per IoC). If other IoC(s) are found across cyberattack chains, then the bonus factor may be applied for each IoC, per number of cyberattack chains.
(e) When the second measure identifies one or more IoC(s) in the cyberattack chain, the value of each measure may be added, and the costs may be added. In some embodiments, the ratio is not used here. In this way, as the cyberattack chain is progressing, i.e., the attacker is gaining ground, additional attention (e.g., in the form of resources) may be put onto this cyberattack chain. This is expressed by a bonus factor in a similar way as above, for instance, the value bonus factor is the number of measures invoked by the cyberattack chain.

Seventh, after a predefined interval, the determination of the value/cost per security measure may be concluded, 514.

Eighth, the cyberattack chains may be evaluated. Each cyberattack chain may have a value for each phase and a cost computed. By disabling/enabling 516 security measures, the value/cost of each cyberattack chain changes and the overall value/cost changes. By disabling/enabling security measures, the overall value is optimized for the currently given, limited available resources (see example below).

Ninth, after an interval, the overall situation may be re-evaluated 516. This re-evaluation may be triggered 518: (a) after a predefined time (e.g., n days); (b) after the set of cyberattack chains provided by the TIC has significantly changed, e.g., a percentage of cyberattack chains has been replaced by new cyberattack chains, and/or a percentage of the IoC in existing cyberattack chains has changed; and/or (c) when the amount of available resources (averaged over a time span) has changed. The determination happens in the process activity 520. If no reevaluation is due—case "Y"— the process returns to the beginning—case For the re-evaluation, previously disabled security measures should be re-enabled, but not necessarily simultaneously and not necessarily on all devices. In case the value/cost measurement is done on the device with resource restrictions (see first sentence in this chapter), depending on the current resource situation, enabling of new security measures may require disabling currently running security measures and/or to limit their resource consumption. In the special case where the re-evaluation was triggered by a changed amount of available resources ninth(c), and conditions ninth(a) and ninth(b) are not met, i.e., the value/cost ratio for the security measures is assumed to be the same, the method may continue with the activity described under "eighth." Otherwise, the method may continue with the first activity 502.

In the context of the above stepwise approach, the following considerations should also be considered. The intention of sixth(c), in some embodiments, may be to highlight that the same measure detecting an IoC present in many cyberattack chains may consume only once the resources for detection (and protective actions, e.g., the attachment containing a virus removed), but interrupts various attack scenarios and is therefore more valuable. This additional value may be expressed in the bonus factor (e.g., number of cyberattack chains containing the IoC raised to the "nth" power, where "n" is between 0.5 (moderate amplification) and 1 (high amplification).

As an example for sixth(d), the cost may be defined as (CPU, RAM, I/O) performance points. The anti-malware scanner may consume (10, 5, 1). The $IoC_1$ may have a relevance of 7 and may only be found in this cyberattack chain while the $IoC_2$ has a relevance of 5 and may be found in three other cyberattack chains. In this example:

value/cost=7*sqrt(1)/(10, 5, 1)+5*sqrt(1+3)/(10, 5, 1)=17/(10, 5, 1).

In the activity sixth(e), the bonus factor may be the number of different security measures invoked by the cyberattack chain raised to the "nth" power, where "n" can be adjusted by varying n between 0.5 and 2. As an example, consider the cyberattack chain "malware." Despite measures that are in place to interrupt the cyberattack chain in an early phase, additional and/or other measures may be needed to counter later phases of the cyberattack chain. In this example, an employee may receive the malicious link via a private email account (thereby circumventing the protected organization's mail system) and the web proxy may block the web site. However, if the attackers have created a new web site name/IP address, the web proxy may not block the access, and the anti-virus measure may interrupt the malware installation. This example is depicted in Table 2:

TABLE 2

| cyberattack chain "malware" | | | |
|---|---|---|---|
| threat intelligence: TTP | sending of emails containing a link to a malicious web site | transfer malware to target system when user opens web site | install and run malware on target system |
| threat intelligence: IoC | link to malicious web site $IoC_1$, $IoC_2$ | name and IP of web site $IoC_3$ | file signature $IoC_4$, $IoC_5$ |
| countering security measure | anti-virus/anti-malware | Web proxy | anti-virus/anti-malware |
| total vale 150/(13, 5, 1) | phase 1 value 120/(10, 5, 1) | phase 2 value 20/(3, 4, 0) | phase 3 value 10/(10, 5, 1) |

As the same security measure AV/AM has identified IoCs in phase 1 and 3, the values of phase 1 and 3 are added (120+10), but not the cost, as the resource consumption occurs only once. By disabling AV/AM, the value/cost in this example drops to 20/(3, 4, 0). By disabling the web proxy, the value/cost in this example drops to 130/(10, 5, 1) for this cyberattack chain.

In a typical environment, some embodiments may have a three- or four-dimensional cost vector, about n=5 security measures, and some hundred cyberattack chains provided by threat intelligence. To reduce the effort finding the current combination of security measures, one considers the following:

When adding up the cost of the n security measures, one may compare the total resource consumption in each area with the available resources. In many environments, one of the resources is the bottleneck (e.g., CPU). If so, then the optimization process will focus largely on this resource.

How, in each cyberattack chain, the value per measure is considered, i.e., how much each measure contributes to each cyberattack chain. Table 3 depicts one illustrative example:

TABLE 3

| | measure 1 AV/AM Cost = (10, 5, 1) | measure3 web proxy Cost = (3, 4, 0) | measure 3 NIPS Cost = (2, 1, 10) |
|---|---|---|---|
| cyberattack chain 1, value = 150 | 130 | 20 | 0 |
| cyberattack chain 2, value = 90 | 50 | 0 | 40 |
| cyberattack chain 3, value = 70 | 0 | 0 | 70 |
| sum (value per measure) | 180 | 20 | 110 |

The value 0 in Table 3 means that the measure is not contributing, as it is not utilized to detect IoCs in the cyberattack chain. For each measure, the cost may be independent of the contribution to the cyberattack chain, but the value may depend on the IoCs provided (with their different value factors) by the threat intelligence and the IoCs actually detected. Depending on the available free resources, measures may be enabled/disabled. For example, in the case where CPU resources are available, but I/O is on the usage limit, measure 1 AV/AM may be enabled and may be executed with a high priority on a Windows system (or high nice factor on a UNIX system).

Figure 6:
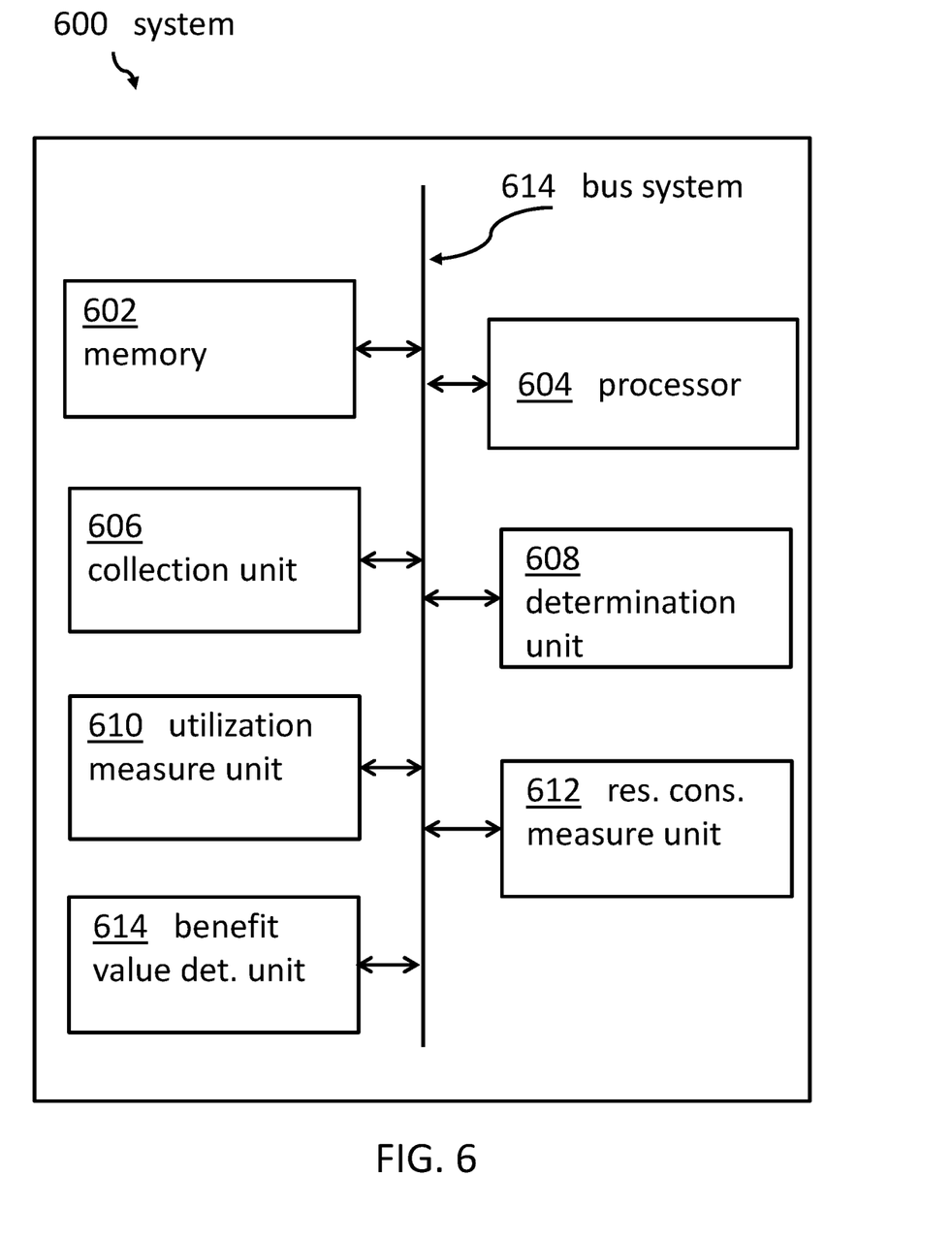
FIG. 6 shows a block diagram of components of the proposed security device, consistent with some embodiments.

FIG. 6 shows a block diagram of elements of the proposed security device 600, consistent with some embodiments. The security system embodiment in FIG. 6 includes a memory 602 operatively coupled to a processor 604. The processor 604, using program code stored in the memory, may be configured to the following:

- Collecting—e.g., by a collection unit 606—threat intelligence data in form of cyberattack chain containing indicators of compromise (IoC);
- determining—by a determination unit 608—a relevance of the cyberattack chain for the device; and
- measuring—by a first or utilization measurement module 610—a utilization of security measures in terms of their detection of the respective IoCs and their respective responses to the IoCs. The security device 600, using the processor 604 and program code stored in the memory, may also be configured to measure—by a second or resource consumption measurement module 612 (the $1^{st}$ and the $2^{nd}$ measurement modules may be the same or integrated)—a resource consumption of the security measures, and
- determining—by a benefit value determination unit 614—a benefit value for each the security measure expressed by its utilization and a relevance value of those of the IoCs detected with it.

The units and modules may be communicatively and/or operatively coupled. This applies particularly to the memory, 602, the processor 604, the collection unit 606, the determination unit 608, the utilization measurement module 610, and the resource consumption measurement module 612. Alternatively, some or all may be connected to a security system internal bus system 614.

Figure 7:
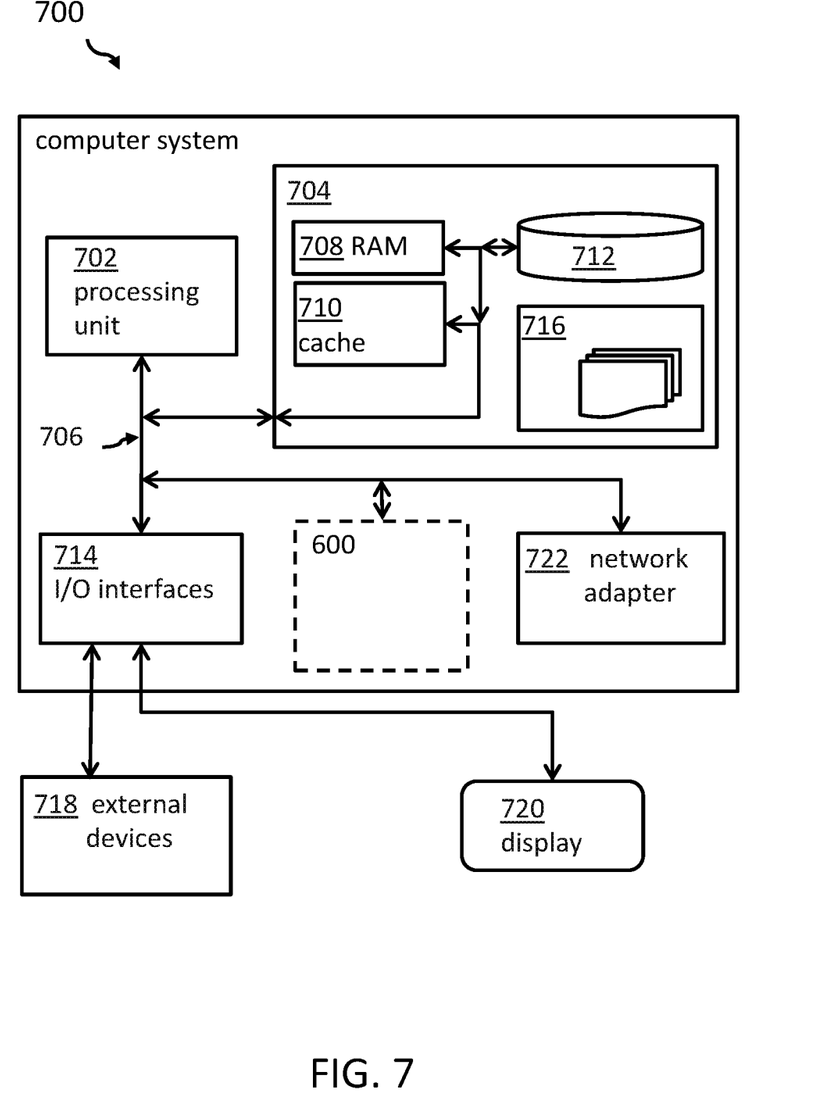
FIG. 7 shows a block diagram of a computing system comprising the proposed security device according to FIG. 6, consistent with some embodiments.

Embodiments of the disclosure may be implemented together with virtually any type of computer, regardless of the platform being suitable for storing and/or executing program code. FIG. 7 shows, as an example, a computing system 700 suitable for executing program code related to the proposed method.

The computing system 700 is only one example of a suitable computer system, and is not intended to suggest any limitation as to the scope of use or functionality of embodiments of the disclosure described herein, regardless of whether the computer system 700 is capable of being implemented and/or performing any of the functionality set forth hereinabove. In the computer system 700, there are components, which may be operational with numerous other general purpose or special purpose computing system environments or configurations. Examples of well-known computing systems, environments, and/or configurations that may be suitable for use with computer system/server 700 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 700 may be described in the general context of computer system-executable instructions, such as program modules, being executed by a computer system 700. Generally, program modules may include routines, programs, objects, components, logic, data structures, and so on that perform particular tasks or implement particular abstract data types. Computer system/server 700 may be practiced in distributed cloud computing environments, where tasks may be performed by remote processing devices that are linked through a communications network. In a distributed cloud computing environment, program modules may be located in both, local and remote computer system storage media, including memory storage devices.

As shown in FIG. 7, computer system/server 700 may be in the form of a general-purpose computing device. The components of computer system/server 700 may include, but are not limited to, one or more processors or processing units 702, a system memory 704, and a bus 706 that couples various system components including the system memory 704 to the processor 702. Bus 706 may represent one or more of any of several types of bus structures, including a memory bus or memory controller, a peripheral bus, an accelerated graphics port, and a processor or local bus using any of a variety of bus architectures. By way of example, and not limiting, such architectures may include an Industry Standard Architecture (ISA) bus, a Micro Channel Architecture (MCA) bus, an Enhanced ISA (EISA) bus, Video Electronics Standards Association (VESA) local bus, and a Peripheral Component Interconnects (PCI) bus. The computer system/server 700 in some embodiments may also include a variety of computer system readable media. Such media may be any available media that is accessible by computer system/server 700, and may include both, volatile and non-volatile media, removable and non-removable media.

The system memory 704 may include computer system readable media in the form of volatile memory, such as random access memory (RAM) 708 and/or cache memory 710. Computer system/server 700 may further include other removable/non-removable, volatile/non-volatile computer system storage media. By way of example only, a storage system 712 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each may be connected to bus 706 by one or more data media interfaces. As will be further depicted and described below, memory 704 may include at least one program product having a set (e.g., at least one) of program modules that are configured to carry out the functions of embodiments of the disclosure.

The program/utility, having a set (at least one) of program modules 716, may be stored in memory 704 by way of example, and not limiting, as well as an operating system, one or more application programs, other program modules, and program data. The operating systems, one or more application programs, other program modules, and program data or some combination thereof, in turn, may include an implementation of a networking environment. The program modules 716 may carry out the functions and/or methodologies of embodiments of the disclosure, as described herein.

The computer system/server 700 may also communicate with one or more external devices 718, such as a keyboard, a pointing device, a display 720, etc., with one or more devices that enable a user to interact with computer system/server 700; and/or with any devices (e.g., network card, modem, etc.) that enable the computer system/server 700 to communicate with one or more other computing devices. Such communication may occur via Input/Output (I/O) interfaces 714. Still yet, computer system/server 700 may communicate with one or more networks such as a local area network (LAN), a general wide area network (WAN), and/or a public network (e.g., the Internet) via network adapter 722.

As depicted, network adapter 722 may communicate with the other components of the computer system/server 700 via bus 706. Although not shown, other hardware and/or software components could be used in conjunction with computer system/server 700. Examples, include, but are not limited to: microcode, device drivers, redundant processing units, external disk drive arrays, RAID systems, tape drives, and data archival storage systems, etc.

Additionally, the security system 600 for providing protection of a computing resource constrained device against cyberattacks may be attached to the bus system 706. Alternately, security system 600 may be implemented by using the computer system/server 700.

The descriptions of the various embodiments of the present disclosure have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to help explain the principles of the embodiments, the practical application or technical improvement over technologies found in the marketplace, and/or to enable others of ordinary skills in the art to understand the embodiments disclosed herein.

The present disclosure may be embodied as a system, a method, and/or a computer program product. The computer program product may include a computer readable storage medium (or media) having computer readable program instructions thereon for causing a processor to carry out aspects of the present disclosure.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include a compact disk-read only memory (CD-ROM), compact disk-read/write (CD-R/W), a DVD, and a Blu-Ray-Disk.

The computer readable storage medium can be a tangible device that can retain and store instructions for use by an instruction execution device, such as a processing unit. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes, without limitation: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in the computing/processing device(s) may receive computer readable program instructions from the network and forward the computer readable program instructions for storage in a computer readable storage medium within the respective computing/processing device.

Computer readable program instructions for carrying out operations of the present disclosure may include, without limitation, assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to adapt the electronic circuitry to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, may implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the disclosure. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present disclosure has been presented for purposes of illustration and description, but is not intended to be exhaustive or limited to the disclosure in the form disclosed. Many modifications and variations will be apparent to those of ordinary skills in the art without departing from the scope and spirit of the disclosure. The embodiments are chosen and described in order to explain the principles of the disclosure and the practical application, and to enable others of ordinary skills in the art to understand the disclosure for various embodiments with various modifications, as are suited to the particular use contemplated.

Accordingly, the descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method for protecting a resource constrained device against cyberattacks, comprising:
   collecting threat intelligence data, wherein the threat intelligence data comprises indicators of compromise (IoC), and wherein the IoCs comprise data related to cyberattack chains;
   determining a relevance of the IoCs for the device;
   measuring a utilization of security measures in terms of their detection of the IoCs and their respective responses to the IoCs;
   measuring a resource consumption of the security measures; and
   determining a benefit value for the security measures, wherein the benefit value is based at least in part on the utilization and on the relevance of the IoCs detected with the security measure.

2. The method of claim 1, further comprising assigning to each of the cyberattack chains a susceptibility value, wherein the susceptibility value is based on the benefit values of the security measures that contribute to a disruption of the cyberattack chain.

3. The method of claim 2, further comprising, based at least in part on the susceptibility value, determining a value of effectiveness for each security measure by summing up its contributions to disrupting each of the cyberattack chains, as protection for the device.

4. The method of claim 1, further comprising selectively enabling and disabling the security measures such that a value of effectiveness of an enabled security measures is optimized towards a disruption of the cyberattack chains with an amount of available computing resources sufficing to satisfy a resource consumption of the enabled security measures.

5. The method of claim 1, wherein the determination of the benefit value for a security measure is based on a factor selected from the group consisting of:
   an external assessment of attack types;
   installed hardware and/or software; and
   an installation specific configuration.

6. The method of claim 1, wherein the benefit value assigned to the security measure is determined by multiplying a number of times a security measure has detected an IoC by a relevance value of the respective IoC.

7. The method of claim 6, wherein the number of times the security measure has detected the IoC is greater than a predefined minimum number of times.

8. The method of claim 1, further comprising re-determining the benefit value at predefined times.

9. The method of claim 8, wherein the re-determining comprises selectively applying security measures to selected ones of a group of devices.

10. The method of claim 1, further comprising re-determining the benefit value when an amount of available resources in the device has changed or when a predefined significant set of the cyberattack chains has changed.

11. A security system for providing protection of a computing resource constrained device against cyberattacks, the security system comprising a memory operatively coupled to a processor, wherein the processor, using program code stored in the memory, is configured to:

collect threat intelligence data, wherein the threat intelligence data comprises indicators of compromise (IoC), and wherein the IoCs comprise data related to cyberattack chains;

determine a relevance of the IoCs for the device;

measure a utilization of security measures in terms of their detection of the IoCs and their respective responses to the IoCs;

measure a resource consumption of the security measures; and determine a benefit value for the security measures, wherein the benefit value is based at least in part on the utilization and on the relevance of the IoCs detected with the security measure.

12. The security system of claim 11, wherein the processor, using program code stored in the memory, is further configured to assign to each of the cyberattack chains a susceptibility value, wherein the susceptibility value is based on the benefit values of the security measures that contribute to a disruption of the cyberattack chain.

13. The security system of claim 12, wherein the processor, using program code stored in the memory, is further configured to, based on the susceptibility value, determine a value of effectiveness for each security measure by summing up its contributions to disrupting each of the cyberattack chains, as protection for the device.

14. The security system of claim 11, wherein the processor, using program code stored in the memory, is further configured to selectively enable and disable the security measures such that a value of effectiveness of an enabled security measures is optimized towards a disruption of the cyberattack chains with an amount of available computing resources sufficing to satisfy a resource consumption of the enabled security measures.

15. The security system of claim 11, wherein the determination of the benefit value for a security measure is based on at least one factor selected from the group consisting of:
an external assessment of attack types;
installed hardware and/or software; and
an installation specific configuration.

16. The security system of claim 11, wherein the benefit value assigned to the security measure is determined by multiplying a number of times a security measure has detected an IoC by a relevance value of the respective IoC.

17. The security system of claim 16, wherein the number of times the security measure has detected the IoC is greater than a predefined minimum number of times.

18. The security system of claim 11, wherein the processor, using program code stored in the memory, is further configured to regularly re-determine the benefit value.

19. The security system of claim 11, wherein the processor, using program code stored in the memory, is further configured to re-determine the benefit value when an amount of available resources in the device has changed or when a predefined significant set of the cyberattack chains has changed.

20. A computer program product for providing protection of a computing resource constrained device against cyberattacks, the computer program product comprising one or more computer readable storage media having program instructions embodied therewith, the program instructions being executable by one or more computing systems or controllers to cause the one or more computing systems to:
collect, by the one or more computing systems or controllers, threat intelligence data in form of cyberattack chain containing indicators of compromise (IoC), wherein the threat intelligence data comprises indicators of compromise (IoC), and wherein the IoCs comprise data related to cyberattack chains;
determine, by the one or more computing systems or controllers, a relevance of the IoCs for the device;
measure, by the one or more computing systems or controllers, a utilization of security measures in terms of their detection of the IoCs and their respective responses to the IoCs;
measure, by the one or more computing systems or controllers, a resource consumption of the security measures; and
determine, by the one or more computing systems or controllers, a benefit value for the security measures, wherein the benefit value is based at least in part on the utilization and on the relevance of the IoCs detected with the security measure.

* * * * *